(12) United States Patent
Grose (10) Patent No.: US 11,845,648 B2
(45) Date of Patent: Dec. 19, 2023

(54) TANKER TRUCK MANIFOLD OFFLOADING SYSTEMS AND METHODS

(71) Applicant: Dean Grose, Eighty Four, PA (US)

(72) Inventor: Dean Grose, Eighty Four, PA (US)

( * ) Notice: Subject to any disclaimer, the term of this patent is extended or adjusted under 35 U.S.C. 154(b) by 0 days.

(21) Appl. No.: 18/087,900

(22) Filed: Dec. 23, 2022

(65) Prior Publication Data

US 2023/0130324 A1    Apr. 27, 2023

Related U.S. Application Data (60) Division of application No. 17/091,800, filed on Nov. 6, 2020, now Pat. No. 11,613,458, which is a continuation-in-part of application No. 17/024,673, filed on Sep. 17, 2020, now Pat. No. 11,725,972.

(60) Provisional application No. 63/034,945, filed on Jun. 4, 2020, provisional application No. 63/022,351, filed on May 8, 2020, provisional application No. 62/978,015, filed on Feb. 18, 2020.

(51) Int. Cl.
  *B67D 7/76* (2010.01)
  *B67D 7/62* (2010.01)
  *B67D 7/02* (2010.01)
  *B60P 3/22* (2006.01)

(52) U.S. Cl.
  CPC .............. *B67D 7/763* (2013.01); *B60P 3/228* (2013.01); *B60P 3/2245* (2013.01); *B67D 7/0277* (2013.01); *B67D 7/62* (2013.01)

(58) Field of Classification Search
  CPC ........ B67D 7/763; B67D 7/0277; B67D 7/62; B67D 7/0238; B67D 7/78; B60P 3/2245; B60P 3/228; B60P 3/2265; B60P 3/227
  See application file for complete search history.

(56) References Cited

U.S. PATENT DOCUMENTS

| | | | | |
|---|---|---|---|---|
| 2,075,126 A * | 3/1937 | Marden | .................. | B67D 7/763 222/530 |
| 2,519,968 A * | 8/1950 | Jordan | .................. | F02B 1/00 244/135 C |
| 2,980,294 A * | 4/1961 | Sacco | .................. | B67D 7/84 222/144.5 |
| 3,830,040 A * | 8/1974 | Hendrix | .................. | B01D 53/34 95/193 |
| 3,867,111 A * | 2/1975 | Knowles | .................. | B01D 53/04 95/146 |
| 5,564,471 A * | 10/1996 | Wilder | .................. | B67D 7/3218 137/614.04 |
| 6,845,882 B2 * | 1/2005 | Todd | .................. | B67D 7/16 222/26 |

(Continued)

*Primary Examiner* — Nicolas A Arnett
(74) *Attorney, Agent, or Firm* — Richard W. James (57) ABSTRACT

A tanker truck offloading manifold method. The tanker truck offloading method includes detecting a tanker truck in at least one of a plurality of offloading stations, energizing a blower having an inlet duct coupled to a tank receiving fluid from the plurality of offloading stations, the blower to draw gasses from the tank when at least one tanker truck is offloading at least one of the plurality of offloading stations, de-energizing the blower when no tanker truck is offloading at any of the plurality of offloading stations, energizing a pump having an inlet coupled to the tank when the tank level is above a predetermined high level, and de-energizing the pump when the tank level is below a predetermined low level.

20 Claims, 9 Drawing Sheets

(56) References Cited

U.S. PATENT DOCUMENTS

| | | | |
|---|---|---|---|
| 8,475,966 B2* | 7/2013 | Knight | B01D 53/002 429/444 |
| 11,613,458 B2* | 3/2023 | Grose | B60P 3/228 141/1 |
| 2010/0089486 A1* | 4/2010 | Koeninger | B67D 7/346 141/2 |
| 2010/0193070 A1* | 8/2010 | Allidieres | F17C 5/06 141/11 |
| 2021/0231263 A1* | 7/2021 | Thibaut | F17C 5/007 |

* cited by examiner

Table of liquid level vs. volume in tank

TANKER TRUCK MANIFOLD OFFLOADING SYSTEMS AND METHODS

CROSS-REFERENCE TO RELATED APPLICATIONS

The present application is a divisional application claiming priority to U.S. Utility patent application Ser. No. 17/091,800, filed Nov. 6, 2020 (the "Parent Application"). The Parent Application is a continuation-in-part of U.S. Utility patent application Ser. No. 17/024,673, filed Sep. 17, 2020, which claims priority to U.S. Provisional Patent Application No. 63/022,351, filed May 8, 2020. The Parent Application and the present application claim priority to all those patent applications and also claim priority to U.S. Provisional Patent Application No. 62/978,015, filed Feb. 18, 2020, and U.S. Provisional Patent Application No. 63/034,945, filed Jun. 4, 2020. Priority is claimed to all the aforementioned applications and all of the aforementioned applications are incorporated herein in their entireties.

BACKGROUND

Field of the Disclosure

The present disclosure relates generally to tanker truck fluid transport systems and methods. The systems and methods may include management capabilities related to tank filling and draining and transport of fluids.

Description of the Related Art

Significant amounts of time are consumed in hauling and transferring fluids to and from sites for certain activities. For example, hydraulic fracturing operations often require large quantities of water-based fluid to facilitate hydraulic fracturing and that fluid is often hauled to the hydraulic fracturing sites by tanker trucks. There is furthermore usually a significant amount of time involved in offloading each tanker truck.

In many current tanker truck operations, tanker trucks offload fluid from their tanks using onboard pumps or by pressurizing their tanks to move the fluid out of each tank. Offloading in those conventional manners may take 30 minutes or more and may be limited by the size of the discharge piping on the truck, such that increasing the speed of offloading can only be minimally impacted by increasing the size of the onboard pump or the pressure applied to the tank. Accordingly, it would be beneficial to have a uniquely configured manifold system for unloading multiple tanker trucks simultaneously that doesn't suffer cavitation issues or extended unloading time issues.

For at least the foregoing reasons, it would be desirable to have an improved tanker truck tank unloading system.

It would be advantageous to have an air and gas removal system in a fluid offloading system.

It would also be desirable to have a multi-truck simultaneous unloading system.

It would be desirable to have a multi-truck simultaneous loading system, as well.

It would also be advantageous to include fluid transfer management capabilities in a tank truck unloading system.

In addition, it would be advantageous to identify the location of a tanker truck that is filling or draining.

It would also be advantageous to have a user interface to receive information from the tanker truck unloading system discussed herein.

It would be beneficial to automatically shut off flow during the unloading process when the tanker truck is empty.

It would be advantageous to have an RFID truck related system that interacts with the unloading system to transfer pertinent truck information and automatically starts the system.

A measurement system that controls an amount of pressure applied to an unloading tank based on the level of fluid in the tank or the volume of fluid in the tank would also be beneficial.

It would be advantageous to eliminate cavitation and pump damage on systems with multiple unloading stations connected to a common manifold with a common pump.

It would be advantageous to unload the truck quicker than what is presently available.

It would be advantageous to track the unloading process via a PLC or computer based system control and monitoring system.

It would be advantageous to have redundancy in the system in case failures occur.

Accordingly, the present invention provides solutions to the shortcomings of prior tanker truck filling and draining systems, apparatuses, and methods. Those of ordinary skill in the art will readily appreciate, therefore, that those and other details, features, and advantages of the present invention will become further apparent in the following detailed description of the preferred embodiments of the invention.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein.

Corresponding reference characters indicate corresponding parts throughout the several views. The exemplifications set out herein illustrate exemplary aspects of the disclosure, and such exemplifications are not to be construed as limiting the scope of the disclosure in any manner.

SUMMARY OF THE INVENTION

In an embodiment, a tanker truck offloading system includes a plurality of tanker truck offloading stations for a plurality of tanker trucks to offload fluid into a manifold simultaneously and a gas separation system coupled to the manifold. The gas separation system includes an intermediate tank coupled to the manifold, a blower coupled to the intermediate tank to remove air and airborne particles from the fluid, and a pump coupled to the intermediate tank to remove fluid from the intermediate tank. The tanker truck offloading system also includes a storage chamber into which fluid pumped from the intermediate tank by the pump is deposited.

In another embodiment, a tanker truck manifold system includes a manifold in fluid communication with a tank and a plurality of tanker truck offloading stations, a tanker truck coupling at an open end of the manifold at each of the plurality of tanker truck offloading stations, and an air separator in fluid communication with the manifold.

A method of offloading a tanker truck is also provided. That method includes detecting a tanker truck in at least one of a plurality of offloading stations, energizing a blower having an inlet duct coupled to a tank receiving fluid from the plurality of offloading stations, the blower to draw gasses from the tank when at least one tanker truck is offloading at least one of the plurality of offloading stations, de-energizing the blower when no tanker truck is offloading at any of the plurality of offloading stations, energizing a pump having an inlet coupled to the tank when the tank level is above a predetermined high level, and de-energizing the pump when the tank level is below a predetermined low level.

Other embodiments, which may include one or more portions of the aforementioned apparatuses and methods or other parts or elements, are also contemplated, and may have a broader or different scope than the aforementioned apparatuses and methods. Thus, the embodiments in this Summary of the Invention are mere examples, and are not intended to limit or define the scope of the invention or claims.

DETAILED DESCRIPTION

The following description is provided to enable those skilled in the art to make and use the described embodiments contemplated for carrying out the concept. Various modifications, equivalents, variations, and alternatives, however, will remain readily apparent to those skilled in the art. Any and all such modifications, variations, equivalents, and alternatives are intended to fall within the spirit and scope of the present concept.

For purposes of the description hereinafter, the terms "upper," "lower," "right," "left," "vertical," "horizontal," "top," "bottom," "lateral," "longitudinal," and derivatives thereof shall relate to the concept as it is oriented in the drawing figures. However, it is to be understood that the concept may assume various alternative variations, except where expressly specified to the contrary. It is also to be understood that the specific devices illustrated in the attached drawings, and described in the following specification, are simply exemplary embodiments of the concept. Hence, specific dimensions and other physical characteristics related to the embodiments disclosed herein are not to be considered as limiting.

As employed herein, the term "number" shall mean one or an integer greater than one (e.g., a plurality).

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification do not necessarily all refer to the same embodiment. References to "or" are furthermore intended as inclusive, so "or" may indicate one or another of the ored terms or more than one ored term.

Figure 1:
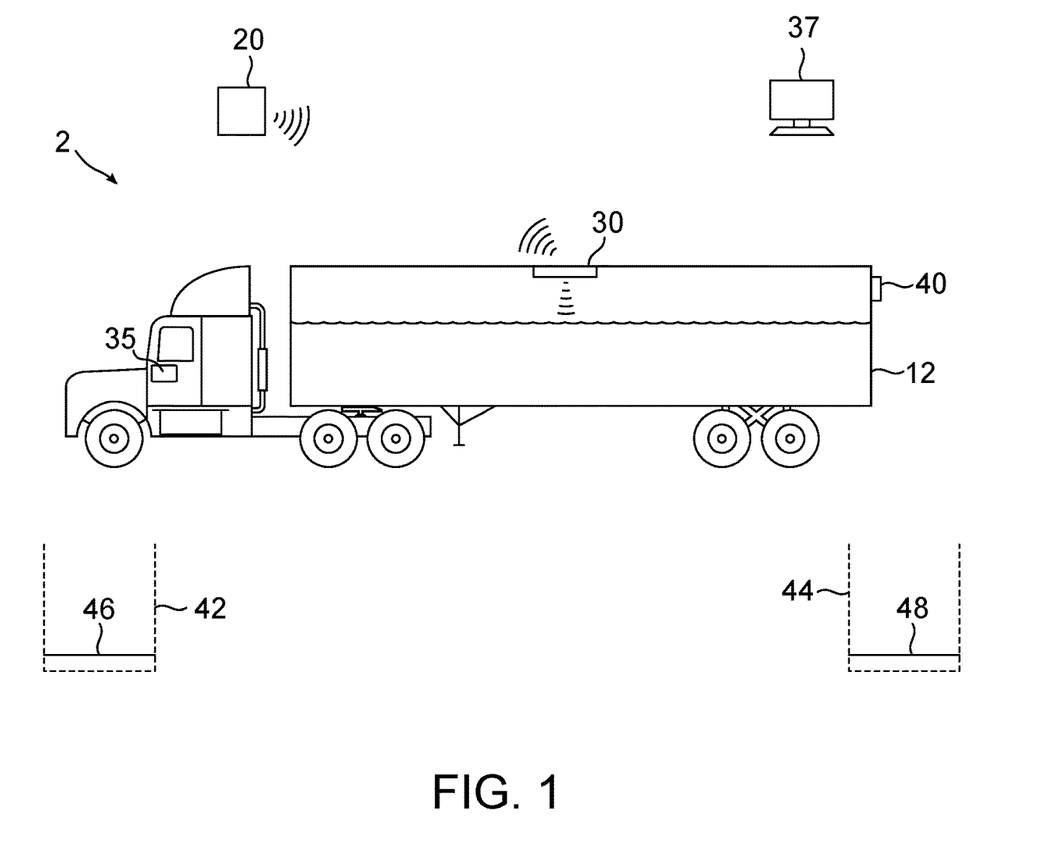
FIG. 1 is a simplified view of a tanker truck fluid level measurement system with location sensing and fluid transfer management capabilities, in accordance with one embodiment of the disclosed invention.

FIG. 1 illustrates a tanker truck fluid level measurement system 2 with management capabilities, in accordance with one non-limiting embodiment of the disclosed tank management system. The tanker truck fluid level measurement system 2 includes a tanker truck 10 having a tank 12 and a level sensor 30 mounted adjacent to the tank. A processor-based device 20 communicates with the level sensor 30. The processor-based device 20 may be coupled to the level sensor 30 by wires or wirelessly. The truck 10 in this embodiment also includes a global positioning device 40, which may determine the relationship of the truck 10 to various gas or oil sites or drill pads 46 and 48, possibly using geofencing technology 42 and 44 arranged to identify those sites 46 and 48.

The processor-based device 20 may be a general-purpose computer; a tablet; a mobile smartphone, referred to herein as a phone; an application specific user interface device; or another device that can be used to transfer information to the tanker truck fluid level measurement system 2 or receive information from the tanker truck fluid level measurement system 2.

The level sensor 30 may be any desired level measuring device, including, for example, a radar level sensor discussed herein, a float type level sensor, a capacitive type level sensor, a sensor that converts pressure into level, or any other type of sensor desired. The level sensor 30 may be mounted adjacent to the tank, for example a radar sensor mounted in or near the top or the tank 12, a pressure sensor mounted in the bottom of the tank, or a float sensor mounted in a tube in fluid communication with the tank 12. Moreover, the level sensor 30 may be permanently attached to the tank 12 or may be removable from the tank 12 for use on another tank 12 or reuse on the same tank 12 at another time.

In an embodiment, the level sensor 30, is a radar-based device and is mounted inside the tank 12 near the top of the tank 12. The radar level measuring device may have an accuracy of 2 mm or 0.08", and may be mounted internally near the top and near the center of the tank 12. Such a radar device may utilize 80 GHz radar, so that the radar device is small, compact, and light (possibly approximately 1.4 lbs.). The radar device may be center mounted underneath a main hatch of the tank 12 for protection. The radar device may point down into the tank 12 and shoot a radar beam to measure the liquid level height. The radar device may be advantageous because it may be extremely accurate in terms of providing the level of the liquid height in the tank 12.

Figure 2:
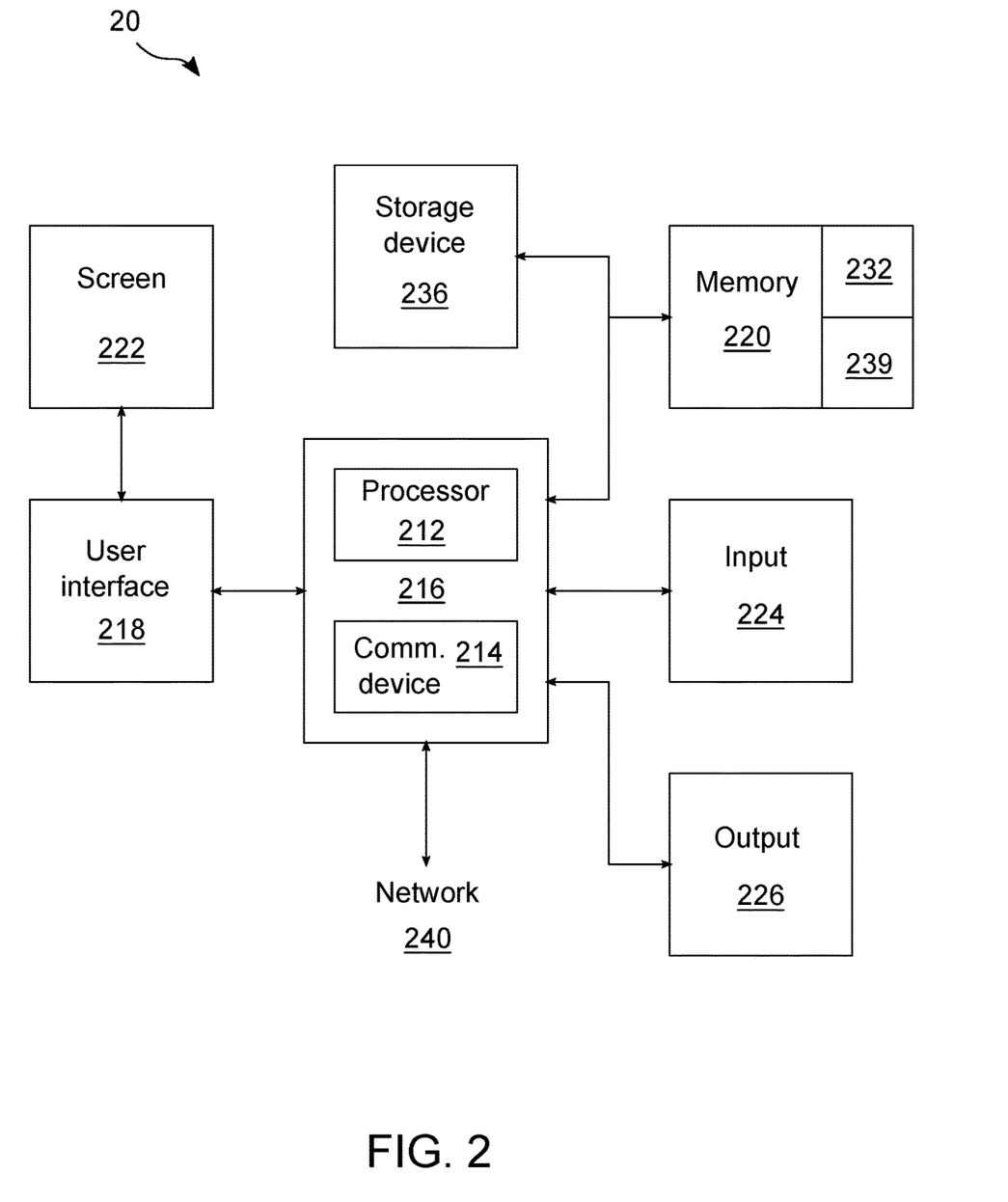
FIG. 2 illustrates an embodiment of a processor-based device to perform aspects of the methods and systems disclosed herein.

FIG. 2 illustrates an embodiment of the processor-based device 20. In that embodiment, the processor-based device 20 includes a processor 212 and a communication device 214. The processor 20 and communication device 214 can be combined in a microprocessor or other device and other components (e.g., 220 and 236) may also be included in such a microprocessor or other device.

The communication device 214 may be wired to a device to which it communicates; the communication device 214 may wirelessly communicate with one or more other devices over a network 240; which may be a wireless network, such as a mobile smartphone network; and the communication device 214 may operate both wired and wirelessly. The processor-based device 20 may furthermore include memory 220, an input 224 that may receive an input signal, such as a signal transmitted by a sensor, and an output 226 that may transmit a control signal, instruction, or data to another device, such as a valve actuator or other controlled device. The output device may alternatively or in addition provide a reading, for example a current volume of fluid in the tank 12, which may be mounted on or near a tank 12 that is being loaded or unloaded.

The processor-based device 20 may also be coupled to a user interface 218 to receive one or more signals from, for example, one or more of a keyboard, touch screen 222, mouse, microphone or other input device or technology and may have associated software. The user interface may also transmit information to, for example, a printer or screen 222 coupled to the user interface 218 or the output 226.

Figure 3:
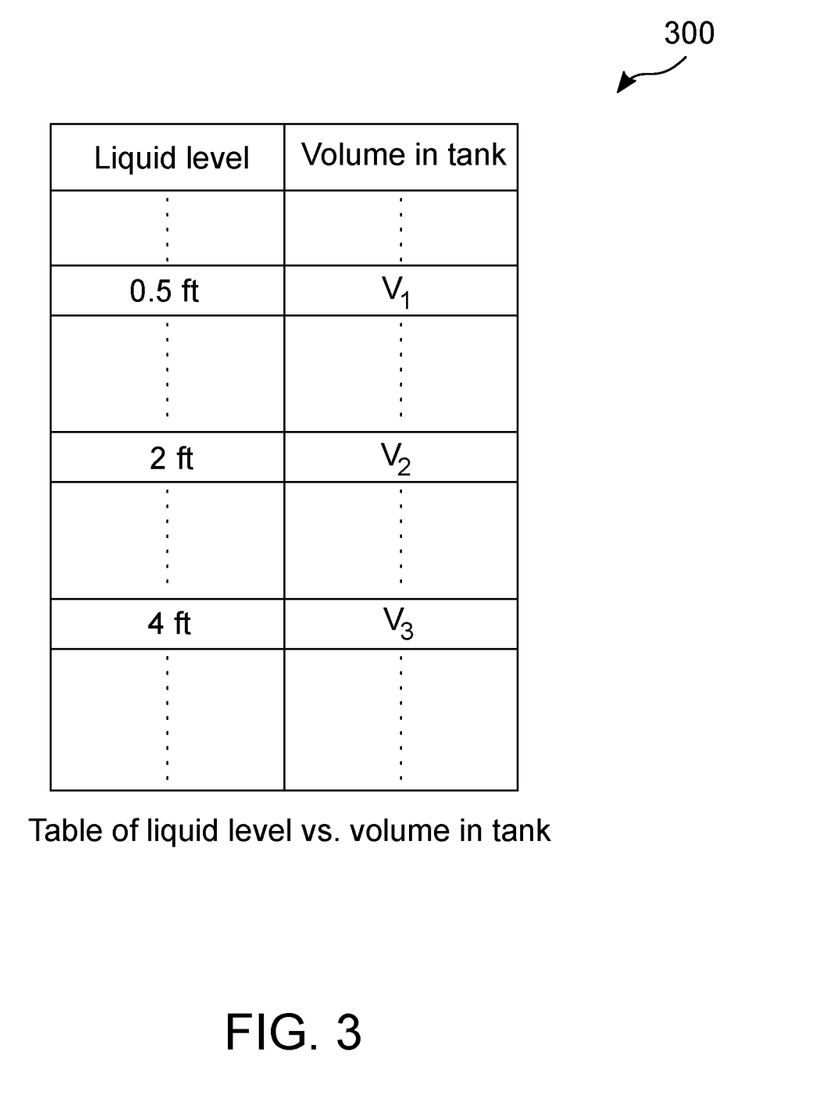
FIG. 3 is a strap chart correlating fluid level and fluid volume for a tanker truck, such as the tanker truck illustrated in FIG. 1.

The memory 220 may, for example, include random-access memory (RAM), flash RAM, dynamic RAM, or read only memory (ROM) (e.g., programmable ROM, erasable programmable ROM, or electronically erasable programmable ROM) and may store computer program instructions and information. In embodiments, the memory 220 may be partitioned into sections including an operating system partition 232 where system operating instructions are stored, and a data partition 239 in which data, such as one or more strap charts 300 is stored.

The storage device 236 may include a memory device or a data storage device or a combination of both memory and data storage devices, or another device or devices for storage of data. The data storage 236 may be considered local storage when the data is stored directly on the processor-based device 20 or the data may be accessible to the processor-based device 20 over a wired or a wireless network. The storage device 236 may furthermore include a computer readable storage medium that includes code executable by the processor 212 of the tanker truck fluid level measurement system 2 that causes the processor 212 to, at least in part, perform as disclosed herein.

In an embodiment, the storage for the processor-based device 20 may include a combination of flash storage and RAM. The storage may include a computer readable storage medium and may include code executable by the processor 212.

In an embodiment, the elements, including the processor 212, communication adaptor 218, memory 220, input device 224, output device 226, and data storage device 236 may communicate by way of one or more communication busses 230. Those busses 230 may include, for example, a system bus or a peripheral component interface bus.

The processor 212 may be any desired processor and may be a part of a controller 16, such as a microcontroller, may be part of or incorporated into another device, or may be a separate device. The processor 212 may, for example, be an Intel® manufactured processor or another processor manufactured by, for example, AMD®, DEC®, or Oracle®. The processor 212 may furthermore execute the program instructions and process the data stored in the memory 220. In one embodiment, the instructions are stored in the memory 220 in a compressed or encrypted format. As used herein the phrase, "executed by a processor," is intended to encompass instructions stored in a compressed or encrypted format, as well as instructions that may be compiled or installed by an installer before being executed by the processor 212.

The data storage device 236 may be, for example, non-volatile battery backed static random-access memory (RAM), a magnetic disk (e.g., hard drive), optical disk (e.g., CD-ROM) or any other device or signal that can store digital information. The data storage device 236 may furthermore have an associated real-time clock, which may be associated with the data storage device 236 directly or through the processor 212. The real-time clock may trigger data from the data storage device 236 to be sent to the processor 212, for example, when the processor 212 polls the data storage device 236. Data from the data storage device 236 that is to be sent across the network 240 through the processor 212 may be sent in the form of messages in packets if desired. Those messages may furthermore be queued in or by the processor 212.

Figure 4:
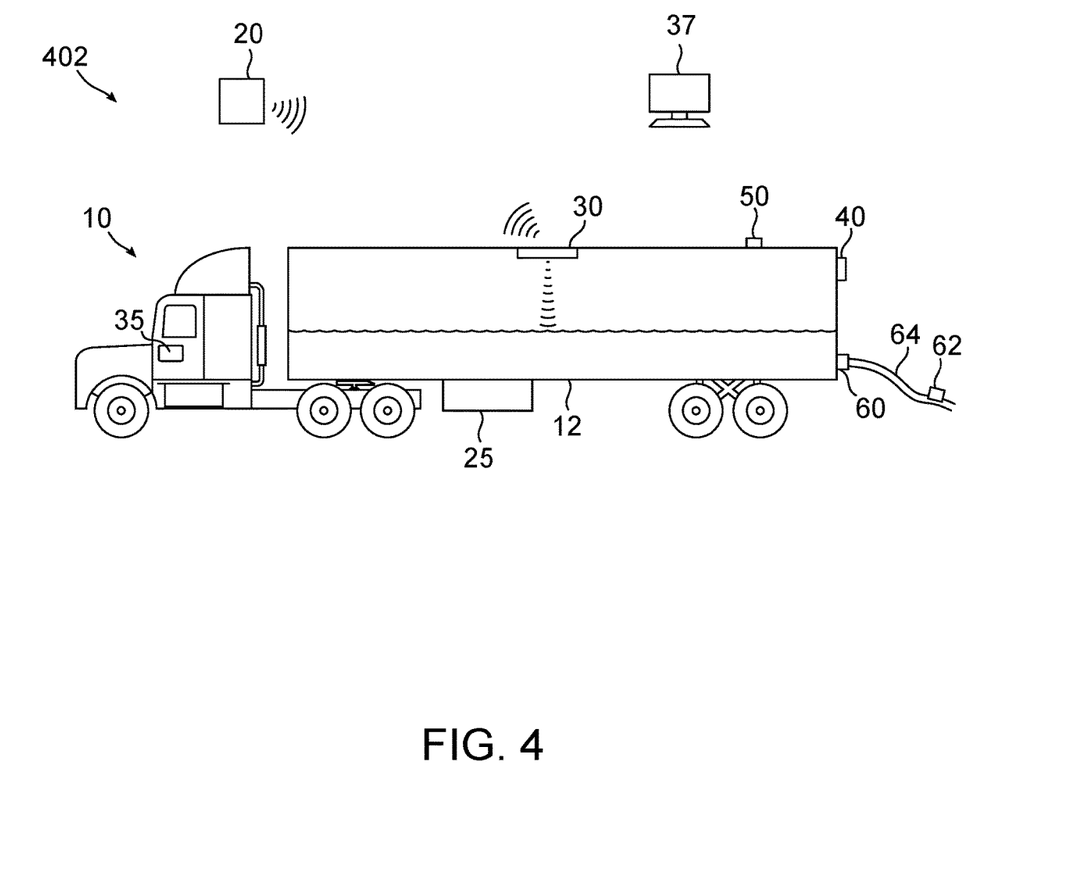
FIG. 4 illustrates an embodiment of a tanker truck fluid level measurement system with management capabilities that includes a tank fill indicator package.

The communication adaptor 218 permits communication between the processor-based device 20 and other nodes, such as a tanker truck controller 35, which may be associated with the level sensor 30, or a remote monitoring peripheral computer 37 or server, both illustrated in FIG. 4. The communication adaptor 218 may be a network interface that transfers information from a node such as a networked device, which would include an actuating device such as valve 60 or a sensing device, such as level sensor 30, the tanker truck controller 35, the remote monitoring peripheral computer 37, a general purpose computer (not illustrated), a user interface device, such as the processor-based device 20 depicted in FIGS. 1 and 2, or another node. The communication adaptor 218 may be an Ethernet adaptor or another adaptor for another type of network communication. It will be recognized that the processor-based device 20 may alternately or in addition be coupled directly to one or more other devices through one or more input/output adaptors (not shown).

The processor 212 may contain in its memory 220 or data storage device 226, or may communicate with another node or data storage device to access, a plurality of strap charts 300, an example of which is illustrated in FIG. 3. The strap charts 300 may equate the level of fluid in a tank 12 to the volume of fluid in that tank 12, establishing a simple and accurate way to determine the volume of fluid in a tank 12. A separate strap 330 chart may exist for each of a variety of tanks 12 from which the processor-based device 210 receives information. For example, a first tanker truck 10 may include a tank 12 and a unique identifier may be associated with that tank 12 or the truck 10 on which the tank 10 is situated.

The tank identifier may be any unique identifier of the tank 12 or the truck 10 on which a particular tank 12 is mounted and may be recognized in a variety of ways. For example, a user interface may be used to identify the tank currently in position to operate (e.g., load or unload), a unique identifier may be transmitted by the tank 12 or associated truck 10 by any signal transmitting device, or an identifier may be read and transmitted by a geofencing 42, 44 or other position determination device that senses the presence of the tank 12 or its associated truck 10.

Because of the variances that may occur through manufacturing, use, and damage, for example, to each tank 12 on each truck 10, the volume of a variety of tanks 12, potentially every tank 12 encountered by the processor-based device 20, at various levels, may be desired to be determined. To provide the volume of the liquid in the tank 12, each tank 12 may be separately calibrated. Such calibration may use a calibration pump skid and each calibration pump skid may utilize a flowmeter 62 (illustrated in FIG. 4) to measure an amount of fluid placed in the tank 12. The amount of fluid placed in the tank 12 may be associated with a level of the fluid in the tank 12 to create a strap chart 220 for that tank that provides the volume of fluid in the tank 12 as an output to a user or device when the level of fluid in the tank is provided as an input by a user or device. For example, in one embodiment, the level of the fluid may be measured each time a barrel of fluid is placed in the tank 12 and the volume of fluid that has been placed in the tank 12 may be associated with the current fluid level in the tank 12 in a table or strap chart 300 so that the number of barrels of fluid in the tank 12 may thereafter be determined by reading from the strap chart 300 the volume that corresponds to any fluid level measured in the tank 12.

In one embodiment, the flowmeter 62 may be a National Institute of Standards and Technology (NIST) certified calibrated flowmeter that is calibrated to be accurate to 0.02%. That flowmeter 62 may be employed to achieve an accuracy of + or − less than 10 gallons and may be accurate to 1 gallon in a nominal 110*bbl* tank. The strap chart 300 may be established in the processor-based device 20 in the form of a two-dimensional array or other database format. The calibrated accuracy of the combined flow meter 62 and strap chart 300 can be correlated to the overall accuracy of the level system, creating a calibrated level system by proxy.

It may furthermore be noted that water may, for example, be placed in the tank 12 to create the strap chart 330, but any liquid or liquified mixture may thereafter be placed in the tank 12 and the volume of that liquid in the tank 12 may be measured using a level sensor 30 and the strap chart 300 for that tank 12. Fluids that may be measured in the tank 12 using the disclosed system may include, but are not limited to, oil, gasoline, water, milk, water mixed with various other solids and liquids, or any other fluid or other substance that may be transported via a tank.

The custom calibrating pump skid disclosed herein may be used when filling the tank 12 during a calibration phase. At the same time the tank 12 is being filled, the radar or other level measuring device 30 will measure the liquid level in the tank 12 and the processor-based device 20 can develop a custom strap chart 300 for the tank 12 as the liquid is placed into the tank 12.

FIG. 3 illustrates a level vs. volume table 300, also called a strap chart, for a particular tank 12. The strap chart 300 may thereafter be used for level/volume correspondence for that tank 12 for the life of that tank 12 or until a modification is made to that tank 12. Similarly, other tanks 12 could be calibrated on the pump skid and have custom strap charts 300 attached to them for use throughout the life of those tanks 12. Accordingly, in the future, when the level device 30 reads the liquid level, it may compare the level sensed to the custom strap chart 300 for that tank 12 and identify the exact volume of liquid in the tank 12 from the level of the fluid in that tank 12. In that way, variations in tank manufacturing are advantageously irrelevant due to use of the custom strap chart 300 developed for each tank 12. Furthermore, the tank calibration is performed independent of the type of liquid in the tank 12, as chemical composition does not impact the readings or volume.

In an embodiment, a plurality of strap charts 300 is accessible by the processor-based device 20, one strap chart 300 existing for every tank 12 in which fluid volume is to be measured. Each strap chart 300 correlates a level of fluid in a particular tank 12 to a volume of fluid held by that tank 12 at that level.

FIG. 4 illustrates another embodiment of a tanker truck volume monitoring system 402. The tanker truck fluid level measurement system 402 includes a tanker truck 10 having a tank 12, a transfer hose 64 that can carry fluid either to the tank 12 or away from the tank 12, a processor-based device 20, a level sensor 30, an indicator 40, a breather valve 50, and a fluid valve 60. The volume monitoring system of FIG. 4 includes an indicator package to assist an operator in filling the tank 12. In one embodiment, the system 402 contains an indicator package that includes two indicator lights. The first light on the indicator 40 may illuminate when the tank 12 is almost full (e.g., 5 barrels less than full) and the second light on the indicator 40 may illuminate when the tank 12 is full or very nearly full. The first light on the indicator 40 may, for example, be yellow and may be used to direct the operator to close a valve on a production tank from which the fluid is being pumped or otherwise transferred into the tank 12 of the truck 10. After stopping the flow of fluid from its source, the operator may empty the transfer hose 64 communicating between the fluid source and the tank 12 into the tank 12. For example, the operator may open a breather valve 50 on the tank 12 and drain the transfer hose 64 into the tank 12. The truck 10 may draw a vacuum during tank 12 filling and may continue to draw the vacuum when draining the transfer hose 64, thereby draining the fluid from the transfer hose 64 into the tank 12.

The second light on the indicator 40 may illuminate when the tank 12 is full or very nearly full. The operator may then cease placing fluid in the tank 12 and shut the production water valve 60 and the breather valve 50, thus yielding a full tank 12 of fluid. As such, the first and second lights on the indicator 40 advantageously assist the driver or other operator to know when to stop filling the tank 12 and shut the valve 60 on the tank 12 so the truck 10 is filled accurately and fully. Other light functionality may also or alternatively be included to indicate empty status or other important points in the filling or emptying process.

In an embodiment, various color indicator 40 lights turn on at the rear of the truck 10 during the filling operation to assist the driver or operator. A yellow light illuminates on the indicator 40 on when the truck is almost full (i.e., 5 bbls to full) and a red light illuminates on the indicator 40 to direct the driver to close the incoming production water valve 60. The operator then opens a ½" breather valve 50 on the tank 12 and empties the transfer hose 64 into the tank 12.

A truck tank pressurization system 25 may be provided to provide pressure or vacuum to a truck 10 tank 12. The truck tank pressurization system 25 may be contained within the tanker truck and the truck tank pressurization system 25 may be powered by the tanker truck 10. Alternatively, the truck tank pressurization system 25 may be external to the truck 10, for example at an onloading or offloading site. The truck pressurization system 25 may furthermore be powered externally to the truck, again for example at an onloading or offloading site.

Truck 10 tanks 12 and the vessels they are loading from or unloading into may be pressurized to enhance that process, for example, using the truck tank pressurization system 25. In certain embodiments, when a truck 10 tank 12 is unloading, the tank 12 is pressurized to assist in moving fluid out of the tank 12. In another embodiment, a vessel the tank 12 is unloading into may create a vacuum or negative pressure to assist in drawing the fluid out of the tank 12. In embodiments where the tank 12 is being loaded, a vessel providing fluid to the tank 12 may be pressurized to assist the fluid in moving from the vessel to the tank 12 or the tank 12 may draw a vacuum to assist in moving the fluid from the vessel to the tank 12. In various embodiments, the truck 10 may continue to operate and draw a vacuum until the transfer hose 64 is empty to drain the fluid in the transfer hose 64 into the tank 12. In certain embodiments, the pressure or vacuum may be modified as loading or unloading operations progress, for example, reducing the pressure in a tank 12 as the fluid level in the tank 12 is reduced or reducing the vacuum in the tank 12 as the tank fills. For example, pressure provided to a tank 12 during unloading may be reduced when the tank 12 approaches empty to reduce the amount of air missing with the unloading fluid. As has been mentioned, the operator may shut the production water valve 60 when a tank 12 is filling and full all but the volume of the transfer hose 64, pressure and suction may be removed or de-energized at that time, and once the transfer hose 64 has been emptied into the tank 12, the tank 12 should have a full load of fluid.

In embodiments, the level sensor may be used to adjust the pressure or vacuum applied to the tank 12 or the vessel. For example, when the tank 12 is draining, the volume monitoring system 402 may provide a signal to an apparatus pressurizing the tank 12 reducing the pressure applied in the tank 12 as the level or volume of the tank 12 is reduced. When the tank 12 is filling, the volume monitoring system 402 may provide a signal to an apparatus creating a vacuum in the tank to reduce the vacuum when the tank 12 nears full.

It should be recognized that any number of lights may be included on the indicator 40 to indicate fluid level in the tank 12 and thereby to assist the operator in filling the tank 12. It should furthermore be recognized that indicators 40 other than lights or in addition to lights may be employed. For example, an audible indicator may be employed to attract the attention of the operator and warn the operator that the tank 12 is nearing its full fill point. In certain embodiments, a combination of an audible indicator, a light indicator, and possibly other indicators are included in the system 2 indicator 40 to gain the attention of the operator when the tank is nearly full.

Furthermore, in accordance with the disclosed invention, the production water valve 60 may be automated to close-off flow to or from the tank 12 at a predetermined time associated with tank 12 level. Accordingly, in an embodiment, the lighting package may operate as described hereinabove, and the automated valve 60 may automatically close when a pre-set tank 12 fill level is reached. Automatic closure of the production water valve 60 advantageously prevents the tank 12 from overfilling and scrubbing out.

A fill-level other than completely full for a tank 12 can alternatively be pre-set so that the fill indicator 40 lights illuminate or the production water valve 60 closes automatically when that preset level is reached, in embodiments in which a full tank 12 is not desired. For example, when the truck 10 is to travel roads that do not permit the weight of a full tank 12 load of fluid, less than a full load in the tank 12 may desirable. One example of when the aforementioned may be applied advantageously is where a 110 bbl truck is not permitted to carry 110 bbls of fluid to a particular location, such as a site in Ohio where a driver must carry no more than 64 bbls per load due to weight restrictions. In the past it has been difficult to determine if there were 64 bbls on the truck, but using the present fluid level measurement system, the driver or operator can pre-set 64 bbls to be transferred into the tank 12 and the indicator 40 lights may illuminate or the automatic valve 60 may close when the tank 12 load approaches or reaches 64 bbls.

Where indicator 40 lights are used in such a less than full load embodiment, the first light on the indicator 40 may illuminate when the tank 12 is approximately 64 barrels less the volume of the transfer hose 64 so the operator or automatic valve control system can stop flow through the transfer hose 64 from the fluid source. The operator or may empty the transfer hose 64 into the truck 10 tank 12 at that time. The second indicator 40 light may illuminate when the tank 12 is filled with the final 64 barrels of fluid to indicate that the tank 12 is full to the desired volume. In certain embodiments, the processor 212 may have stored or receive a quantity of fluid held by the transfer hose 64 and may determine when to indicate that fluid transfer should cease based on the difference between the capacity of the tank 12 and the capacity of the transfer hose 64.

In accordance with the disclosed system, the amount of fluid in the tank 12 can advantageously be determined with precision. Once that is known, reports can be generated for invoicing and billing purposes, regulatory reporting purposes, safety purposes (e.g., if the truck 10 would have an accident the responders will know exactly how much liquid is in the truck 10) and other desired purposes.

The level reading may be transmitted to one or more computerized devices for processing. For example, the level may be sensed by a level sensor 30 and the level may be transmitted electronically to a computerized device, such as the processor-based device 20, that uses the strap chart 302 for that tank 12 to determine the volume of fluid contained in the tank 12. In an embodiment, the level sensor 30 is a radar unit and the level is wirelessly transmitted via Bluetooth or another form of transmission to a level gauge located at the rear of the truck 10, a level gauge in the cab of the truck 10, or to an external user interface, such as a computer, a phone 20 shown in simplified form in FIG. 1, a tablet, or another electronic device. The processor-based device 20 may also receive the level from the level sensor 30 and generate volume data for the fluid for tracking purposes or other purposes. Regulatory reports, Bills of Lading, and other documentation may be automatically be generated from the processor-based device 20 or another device based on the information received and determined by the device 20 or another device. For example, the volume of water discharged at a site by each truck that discharged water at that site may be provided electronically or in printed form by the device 20

Alternatively, or in addition, the level sensor 30 may transmit to another device, an electronic signal that corresponds to an output signal provided by the level sensor 30, such as an electronic signal that corresponds to a 4-20 mA signal. In an embodiment, a wireless device, such as a Bluetooth device, is enabled to capture a 4-20 mA signal from a radar-based level sensor 30 or another level sensing device. The radar-based level sensor 30 senses the level of the fluid in the tank 12 and transmits that level to the wireless device via a 4-20 mA signal. That signal is then referenced against the calibrated strap chart and the volume of fluid held in the tank 12 is produced, for example in gallons or barrels, from the level and the strap chart.

It is also contemplated herein that the system 2 may be employed with a number of geo-fences 200, 300, shown in simplified form in dashed line drawing in FIG. 1 to determine the location of the truck 10 when it loads or unloads. For example, reference numerals 210, 310 denote well pads configured to contain oil that the truck 10 will obtain. As shown, surrounding each well pad 210, 310 is a corresponding one of the geo-fences 200, 300, a virtual fence that may include GPS coordinates of the location of the well pads 210, 310. Additionally, as shown, the truck 10 may also have a GPS system 100, shown in simplified form and the location of the truck 10 may be determined from the GPS system 100. Using that system, when a truck 10 that arrives at well pad 210, the GPS system 100 will indicate that the truck 10 is located at the geo-fence 200. Accordingly, when the truck 10 arrives at the geo-fence 200, the geo-fence 200 will advantageously be able to indicate that the truck 10 was previously at, for example, the geo-fence 300. This truck 10 location information makes tracking the fluid in the truck 10 significantly easier. Once the fluid is moved to a new well pad 210, 310, the truck 10 is registered at the new geo-fence 200, 300, which is recorded for the specific truck. In this manner, the travel path and distribution or accumulation of the liquid in the tank 12 can be recorded and monitored.

Figure 5:
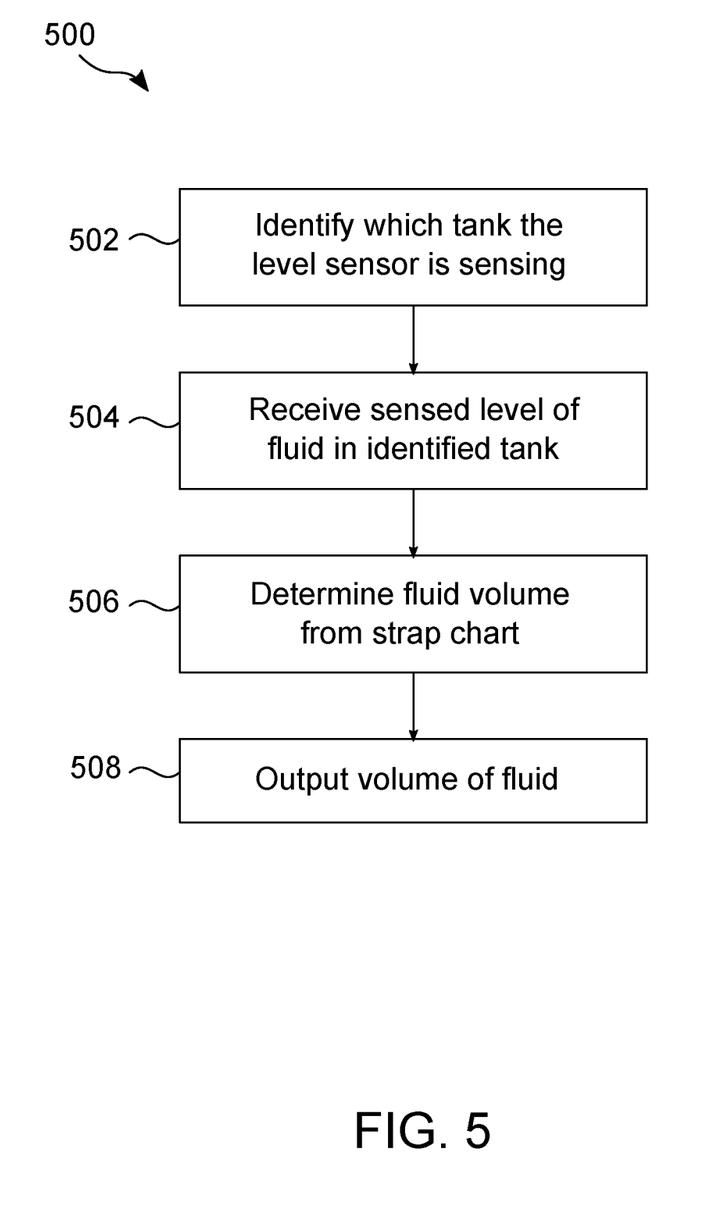
FIG. 5 illustrates a method of performing volume measurement.

FIG. 5 illustrates a method 500 of measuring the volume of a tanker truck 10 tank 12 performed by a processor 212. At 502, a tank identifier indicates to the processor 212 which tank 12 the level sensor 30 is sensing, the level sensor 30 providing a signal corresponding to the level of fluid in that identified tank 12. At 504, the level sensor 30 provides a signal to the processor 212 corresponding to the level of fluid in the identified tank 12 and the processor 212 receives that level signal. At 506, the processor 212 correlates the level of the fluid to a strap chart 300 for the identified tank 12, the strap chart 300 having been previously created and stored for access by the processor. At 508, the processor 212 provides an output representing the volume of fluid that corresponds to the level of fluid indicated for the tank 12, the volume correlating to level in the strap chart 300.

Figure 6:
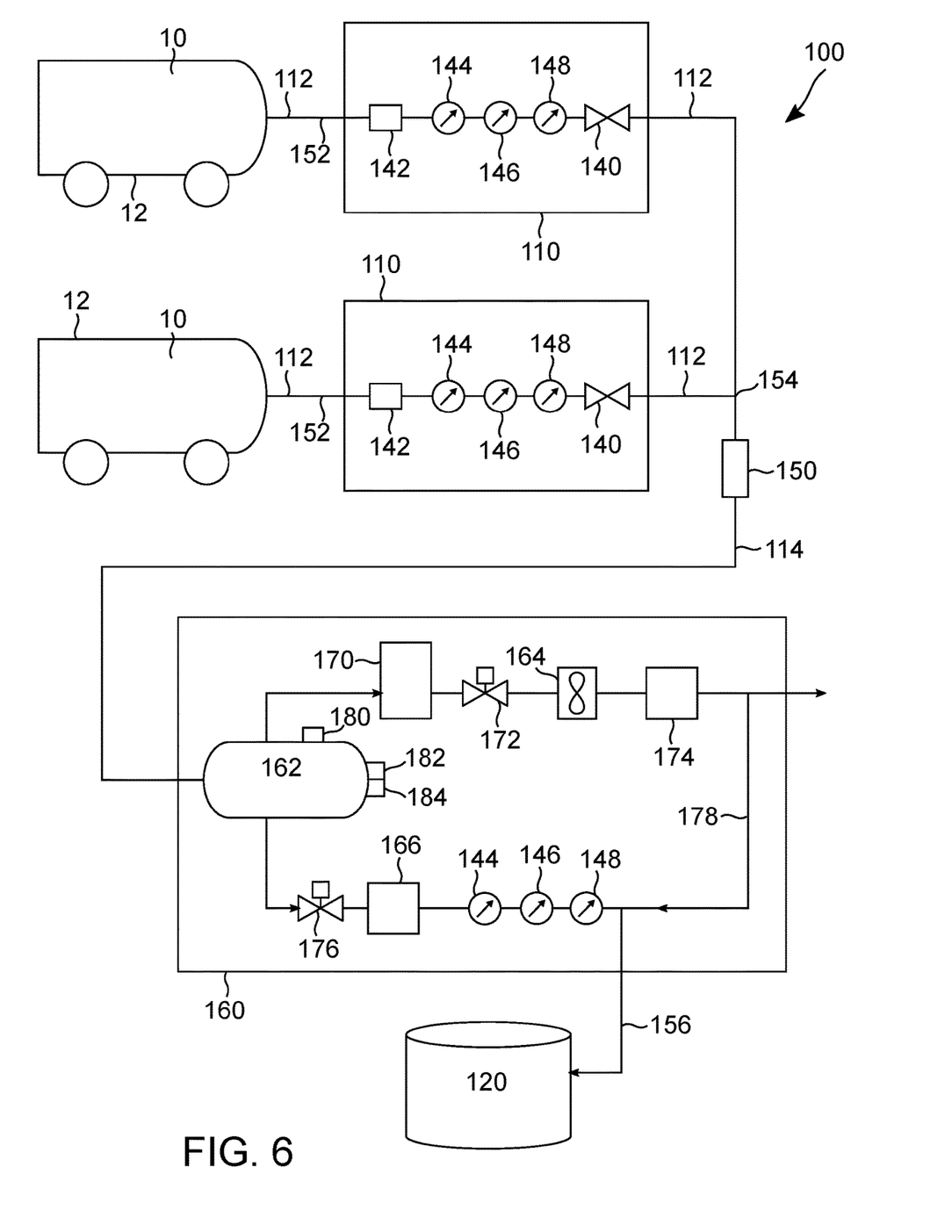
FIG. 6 illustrates an embodiment of a vacuum tank unloading system.

FIG. 6 illustrates an embodiment of a vacuum tank unloading system 100. The vacuum tank unloading system 100 of this embodiment may be employed to expedite offloading of tanker trucks 10. In this embodiment a plurality of tanker truck 10 offloading stations 110 are provided so that more than one tanker truck 10 can have fluid from their associated tanks 12 offloaded simultaneously into the manifold. For example, in an embodiment for offloading tanks of water-based fluids used in hydraulic fracturing, ten offloading stations 110 may be provided. A tanker truck 10 may pull up to and connect to a manifold system 101 through an offloading station 110 when that offloading station 110 is not occupied or otherwise used by another truck 10. An offloading station 110 can be used independent of other station occupancy, regardless of any use or maintenance occurring of the other offloading stations 110, and regardless of whether one or more trucks 10 occupying one or more other stations are in the process of offloading. The tanker truck 10 that pulls into an offloading station can connect to an offloading line 112 at the offloading station 110 and offload the contents of its tank 12 through the offloading line 112 while other trucks 10 are simultaneously offloading their tanks 12.

In an embodiment, an offloading station 110 includes a flexible transfer hose hook-up coupling 152 through which fluid from the tank 12 of the truck 10 can flow into a manifold 114 and from there, directly or indirectly, into a site tank 120. The manifold 114 may be in fluid communication with each offloading station 110 and the site tank 120. The manifold 114 may be a piping system that accepts fluid from each offloading station 110, combines fluid received from the offloading stations 110 at one or more junctions 154, and deposits the fluid received from the offloading stations 110 into the site tank 120.

The manifold 114 may be configured in various ways that are suited to an offloading site. The manifold 114 illustrated in FIG. 6 includes a plurality of offloading lines 112, with a manifold 114 branch extending to each offloading station 110. The offloading lines 112 join at one or more junctions 154 to a common line 114 that extends to a tank such as the intermediate tank 162 illustrated in FIG. 6. A fill line 156 extends from the intermediate tank 162 to a destination which, in the embodiment illustrated in FIG. 6, is the site tank 120. The fill line 156 may alternatively extend to any desired destination into which the fluid from the truck 10 tanks 12 is desired to be deposited, including, for example, a storage vessel of any type, an underground storage area, a well, or a rig of some type, such as a drill rig. The manifold 114 may further include a variety of apparatuses in each offloading line 112, which may include an offloading valve 140, a sight tube 142, a pressure gauge or sensor 144, a flow gauge or sensor 146, a temperature gauge or sensor 148, or any other desired gauge or sensor. For the purpose of this disclosure, gauges may provide a visual representation of a characteristic of the fluid in the offloading line 112 or any other pipe, and a sensor may provide a signal that represents a fluid characteristic to a processor-based device, such as the one illustrated and discussed in connection with FIG. 2 or a control system or other computing device, such as the manifold control system 402 illustrated in FIG. 7. Sensor signals may, furthermore, be transmitted through wires or wirelessly.

A flow meter 150 or other flow measuring device may be placed in the manifold 114 common line to measure the total flow through the manifold 114 of the vacuum tank system 101. That flow measurement may be used to determine total flow into the vacuum tank system 101 and may be used to control flow into the manifold 114, for example, through the offloading valves 140. Alternatively, a flow switch may be placed in the manifold 114 common line to indicate fluid is flowing through the manifold 114. Either the flow meter 150 or switch may be coupled to a computerized monitoring or control system including the processor-based device 20 illustrated and discussed in connection with FIG. 2 and the control system 400 illustrated and discussed herein in connection with FIG. 7.

The offloading valves 140 may be located in each offloading station 110 to control or flow from the offloading stations 110 or to isolate one or more offloading stations 110. The offloading valves 140 may be a variety of types of valves, including a ball valve, a gate valve, or a globe valve. The offloading valve 140 may furthermore be actuated manually or may be automatically controlled for full opening or closure or may be modulated for regulated flow by a manifold control system, such as the control system 400 illustrated in FIG. 7. The offloading valve 140 may be of a size that permits full flow of fluid from the truck 10 tank 12, such as a 4" valve with a full flow characteristic. The full flow characteristic of a ball valve, for example, may be beneficial to enable fast offloading of tanks 12 coupled thereto. Alternatively, the offloading valve 140 may be configured with a linear control characteristic, such as that provided by a globe valve, or may have another desired flow characteristic. The offloading valve may furthermore be used to permit flow into the offloading line 112 when open and to prevent flow into the offloading line 112 when closed.

Figure 7:
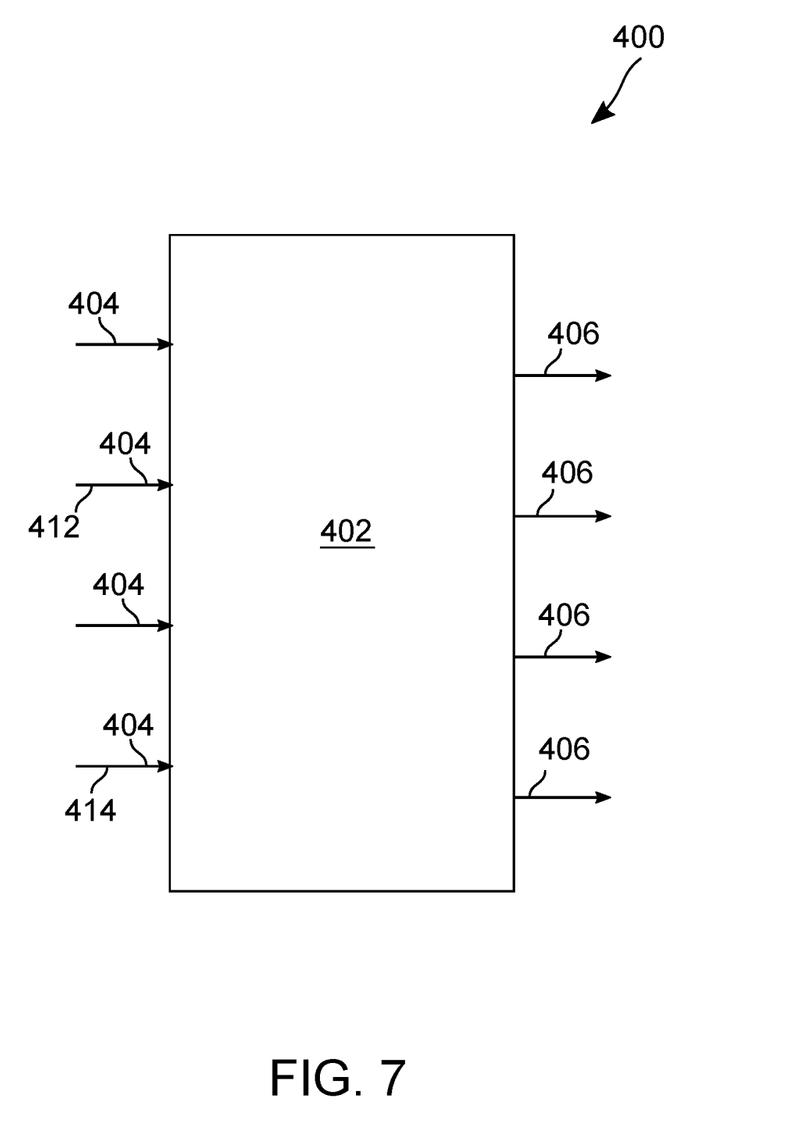
FIG. 7 illustrates an embodiment of a manifold control system.

Control of the offloading valve 140 and other components of the vacuum tank unloading system 100 may be performed using a computer, such as the processor-based device 20 illustrated and discussed herein in connection with FIG. 2, or a controller, such as the manifold control system 400 illustrated and discussed herein in connection with FIG. 7.

The pressurization or vacuum system discussed in connection with FIG. 4 herein may be used in operation of embodiments of the pressurize or vacuum in the vacuum tank unloading system 101. For example, the vacuum tank unloading system 101 may be used in one or more trucks 10 that are unloading to pressurize the tanks 12 of those one or more trucks 10 when unloading those tanks into the offloading lines 112 and manifold 114. Alternatively or in addition, vacuum may be applied to the intermediate tank 162 or another place in the offloading lines 112 and manifold 114 to draw fluid from offloading tanker trucks 10 into the vacuum tank unloading system 101. That vacuum may be applied by the air removal system 160 or may be provided by a separate vacuum apparatus.

The truck fluid level measurement system 20 may be used to transmit one or more truck tank levels to the vacuum tank unloading system 100. The truck tank level information may be used by the processor-based device, such as the one illustrated and discussed in connection with FIG. 2 or a control system or other computing device, such as the manifold control system 402 illustrated in FIG. 7, to automatically control the vacuum system to decrease the vacuum as the fluid level in the truck 10 tank 12 or tanks 12 decreases to minimize air mixing with the fluid.

Fluid unloaded from a tanker truck 10 is known to sometimes encounter gas, particularly air, mixing with the fluid. It is common, for example, for an offloading tank to provide nearly all fluid when it begins to offload and to provide fluid mixed with a substantial amount of air when the tank 12 is nearly empty. Thus, in one example, multiple trucks 10 unload simultaneously and during that simultaneous offloading some trucks 10 may provide nearly pure fluid with little air while other trucks 10, for example those with tanks that are nearly empty or offloaded, provide fluid mixed with air or simply air with little fluid. When gasses, such as air, are mixed with the fluid, the gas pockets in the fluid tend to cavitate and can, for example, airlock a non-flooded suction water pump. Such airlock inhibits operation of the pump and can cause damage to the pump. Accordingly, an air removal system 160 may be provided in the vacuum tank system 100.

The air removal system 160 of the vacuum tank system 101 may include an intermediate tank 162 coupled to a blower 164 for air removal and a pump 166 to transfer fluid from the intermediate tank 162 to the site tank 120. A benefit of including such an air removal system 160 is that fluid reaches the pump 166 and is moved by the pump into the site tank 120, while air is removed from the intermediate tank 162 by the blower 164, preventing air or other gasses in the intermediate tank 162, likely sourced from the offloading trucks 10, from reaching the pump 166. Another benefit of including an air removal system 160 is the truck 10 tanks 12 may offload more quickly with the pump 166 drawing fluid from the vacuum tank system 100 and the blower 164 applying a vacuum to the intermediate tank 162.

The blower 164 portion of the air removal system 160 may include a foam tank 170 into which foam and air may transfer from the intermediate tank 162 through gravity or vacuum created by the blower 164 or another fan or air moving device. The blower 164 portion of the air removal system 160 may also include a suction valve 172, which may be operated automatically or manually, and a silencer 174 to reduce noise emitted from the blower 164 of the air removal system 160. The air removal system 160 may also include a drain line 178 through which fluids that pass through the blower or otherwise collect in the blower 164 discharge to drain into the site tank 120. The blower 164 may furthermore maintain a vacuum in the upper portion of the intermediate tank 162 to assist in removing air, foam or other airborne particles from the intermediate tank 162. The vacuum created by the blower 164 may furthermore draw fluid into the intermediate tank 162.

The suction valve 172 may be opened, closed, or modulated, for example by the processor-based device 20 illustrated and discussed herein in connection with FIG. 2, or the manifold control system 400 illustrated and discussed herein in connection with FIG. 7. The suction valve 172 may be opened or closed to control suction applied by the blower 164 to the intermediate tank 162 or the manifold 114 or to separate fluid communication between the blower 164 and the intermediate tank 162, for example for maintenance.

The blower 164 may, moreover, have a variable speed motor such that a pressure sensor may be placed in the upper part of the intermediate tank 162 and the blower speed may be varied to maintain a desired amount of vacuum at that pressure sensor through the manifold control system 400. In certain embodiments, the blower 164 will be de-energized if the fluid level in the intermediate tank 162 rises to a level that may cause fluid to be drawn into the blower 164.

The pump 166 portion of the air removal system 160 may include a sight tube 142, a pressure gauge or sensor 144, a flow gauge or sensor 146, a temperature gauge or sensor 148, or any other desired gauge or sensor situated in piping before or after the pump 166. The pump 166 portion of the air removal system 160 may also include a suction valve 176 that may be manually or automatically operated to control fluid flow or to prevent fluid communication between the intermediate tank 162 and the pump 166, for example, for maintenance.

In an embodiment, the pump 166 will operate automatically to maintain a desired fluid level in the intermediate tank 162. In such an embodiment a high-level switch 182 may energize the pump 166 to transfer fluid from the intermediate tank 162 to the site tank 120 when the high level set on the high-level switch 182 is exceeded and a low-level switch 184 may de-energize the pump 166 to allow fluid to gather in the intermediate tank 162 when the level of the intermediate tank 162 as set on the low-level switch 184 is reduced below the level sensed by the low-level sensor switch 184. A level sensor may replace both the high-level switch 182 and low-level switch 184 in certain embodiments, the level sensor energizing and de-energizing the pump 166 at desired levels. A hysteresis band may be set between the high-level switch and the low-level switch to minimize pump cycling. In another embodiment, the pump 166 may have a variable speed motor and may vary the speed of the motor to maintain a desired level in the intermediate tank 162.

The intermediate tank 162 may, for example, be a 4000-gallon tank and it may be maintained at a vacuum when the vacuum tank system 101 is operating. The vacuum may speed offloading by drawing fluid from the truck 10 tanks 12. Air and other gasses may be separated from the fluid in the intermediate tank 162 when the bower 164 and pump 166 operate as described in connection with the air removal system 160 and pump 166 described herein.

The vacuum tank system 101 may be placed in a heated building or trailer to prevent freezing and drains may be installed in the manifold 114 to drain the manifold 114 when, for example, the manifold 114 is not in use or winterization is required.

FIG. 7 illustrates an embodiment of a manifold control system 400. The manifold control system 400 may include a computerized monitoring and/or control system (CMCS) controller 402, such as, for example, a programmable logic controller (PLC) with inputs 404 and outputs 406 or a distributed wireless control system. The manifold control system may include any or all of the components discussed in connection with the processor-based device 20 described herein including, but not limited to, a processor 212, memory, 220, and a data storage device 236. Inputs 404 to the controller 402 may include inputs configured to receive signals transmitted from one or more sensors such as, for example, pressure sensors, flow sensors, and position sensors. Outputs 406 from the manifold control system 400 may include outputs configured to transmit control signals and actuating signals such as, for example, a 4-20 mA control signal sent to a variable speed pump or blower VFD drive, relays to energize and de-energize equipment such as the offloading valves 140, other electrical signals, and 2-position or modulating pneumatic and hydraulic signals to be transmitted to various valves or other equipment.

Figure 8:
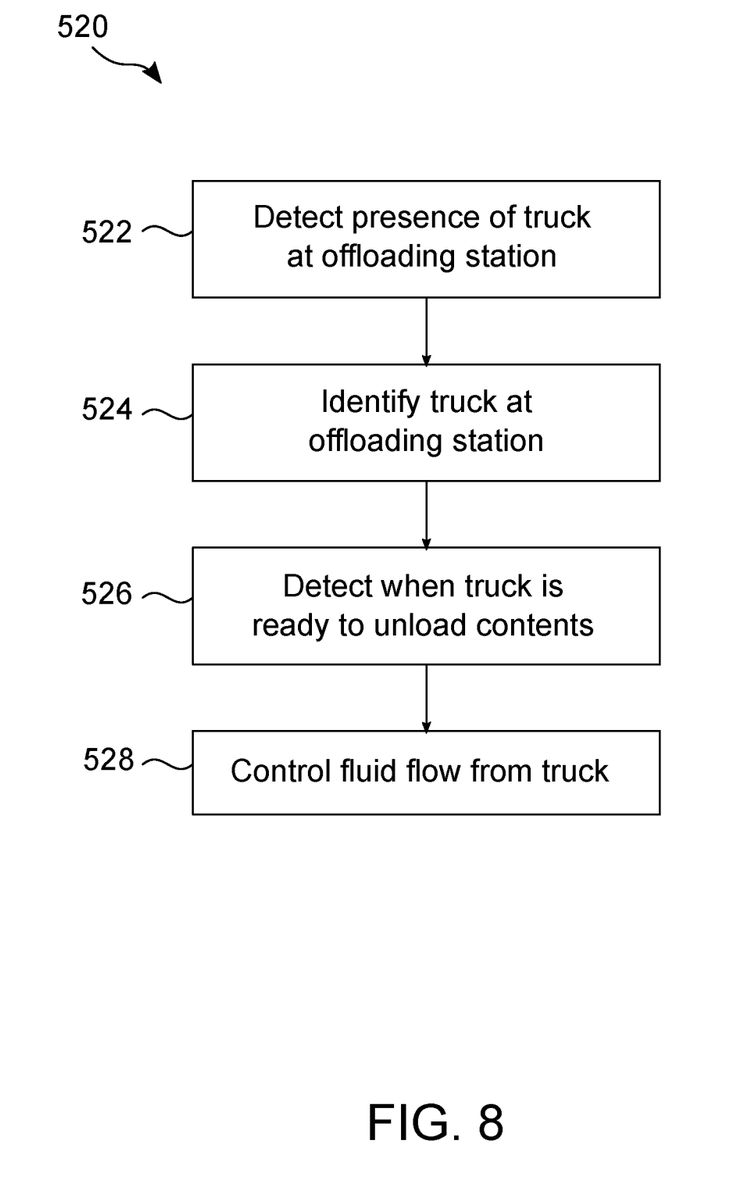
FIG. 8 illustrates a method of operating one or more offloading stations in a vacuum tank unloading system.

FIG. 8 is a flow chart of a method 520 of operating one or more offloading stations 110 in a vacuum tank unloading system 100 that may be performed, at least in part, by the controller 402 or distributed control system. In the embodiment illustrated in FIG. 8, the controller 402 or distributed control system may receive a signal at an input 404 from a sensor indicating that a tanker truck 10 is located in an offloading station 110 at 522. The controller 402 or distributed control system may alternatively or in addition receive a signal at an input 404 that identifies the truck 10 that is positioned in that offloading station 110 at 524. At 526, the controller 402 or distributed control system may receive an input 404 indicating that at least one truck 10 in an offloading station 110 is connected to the hook-up and ready to unload the contents of its tank 12. In embodiments, the controller 402 or distributed control system may receive the identification of the truck 10 unloading by methods including a user inputting that information or the truck 10 transmitting an identifier. At 528, the controller 402 or distributed control system may open or otherwise control fluid flow from the tanker truck 10, through the offloading station 110 using the offloading valve 140. Fluid flow through the offloading valve may be controlled in various ways including to maintain a desired pressure at pressure sensor 144 or to maintain a desired fluid flow rate at the flow meter 150.

In embodiments, the method 520 operates to unload one or more tanker trucks 10 into a manifold, thereby more quickly offloading fluid carried by those tanker trucks 10 than traditional offloading. In doing so, a tanker truck 10 may pull into an offloading station 110 and connect the tanker truck 10 tank 12 to the manifold 114 through a flexible transfer hose hook-up coupling 152. A transfer hose may be connected between the tanker truck 10 tank 12 and a transfer hose hook-up coupling 152 in fluid communication with the manifold 114 to permit fluid flow from the tank 12 into the manifold 114.

Figure 9:
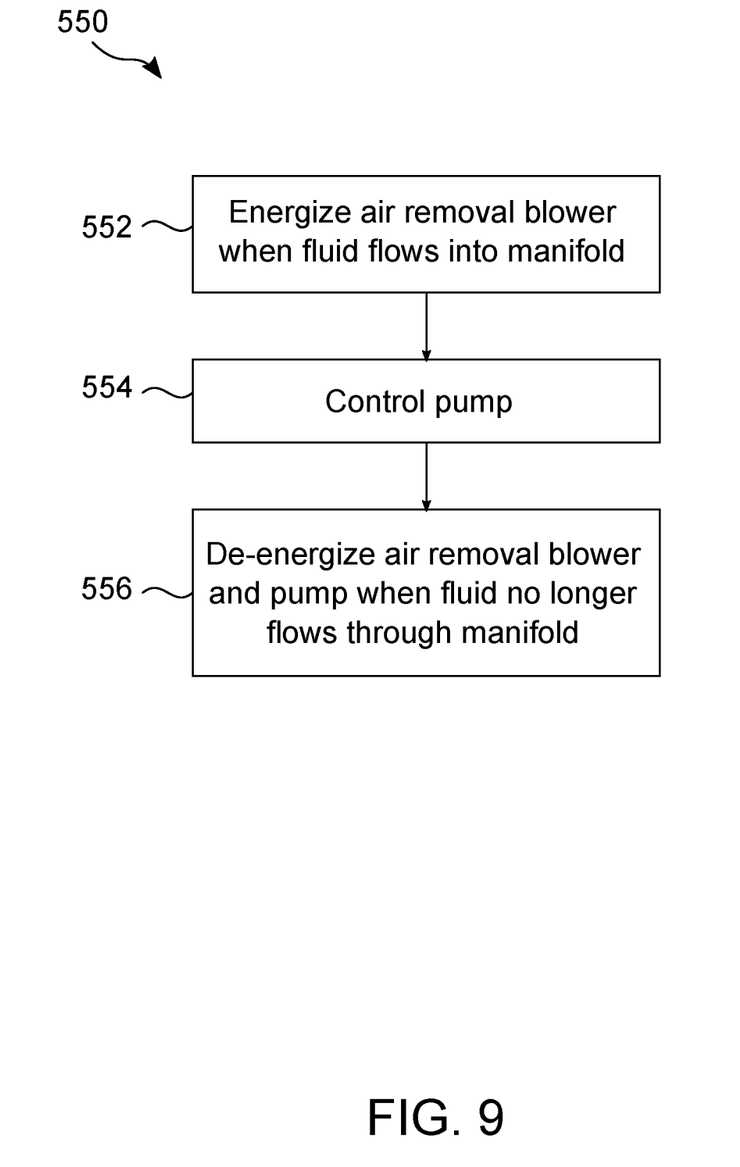
FIG. 9 illustrates a method of operating an air removal system.

FIG. 9 is a flow chart of a method 550 of operating an air removal system 160 in a vacuum tank unloading system 100 that may be performed, at least in part, by the controller 402 or distributed control system. At 552, in response to a signal indicating there is fluid flowing into the manifold 114, the controller 402 or distributed control system may operate the air removal system 160, energizing the air removal blower 164 to remove air from incoming fluid entering the intermediate tank 162 or to provide suction to more quickly empty fluid from offloading truck 10 tanks 12. Sensing that there is fluid flowing into the manifold may be performed in a variety of ways, including: sensing that a transfer hose has been connected to the manifold 114 at one of the offloading stations 110, sensing that an offloading valve 140 has been opened, sensing fluid flow in the manifold 114 The method of operating an air removal system 550 may also open or otherwise control the opening of the suction valve 172 to permit airflow to and through the blower 164. In embodiments wherein the blower 164 is operated by a variable speed drive, the controller 402 or distributed control system may control the speed at which the blower 164 operates, for example, to maintain a desired vacuum at a pressure sensor 180 in the intermediate tank 162 or another desired location.

At 554, the controller 402 or distributed control system may control the pump 166. In embodiments, the pump 166 may be cycled on and off in response to high and low-level switches 182 and 184 or a level sensor to maintain a desired fluid level in the intermediate tank 162. Alternatively, the speed of the pump 166 may be varied to maintain a desired level in the intermediate tank 162 in embodiments where a variable speed pump 166 is employed.

At 556, the controller 402 or distributed control system may de-energize the blower 164 and pump 166 when fluid is no longer flowing through the manifold 114 and the intermediate tank is at a desired level.

The inputs 404 of the controller 402 or distributed control system may include statuses 412 and 414 for various valves, such as offload station 110 valves 140, air removal system 160 isolation valves, or a site tank 120 isolation valve. The inputs may also include level sensors or switches, such as high and low site tank 120 level switches or intermediate tank 162 level switches.

The controller 402 or distributed control system outputs 406 may include control relays or other mechanisms to energize and de-energize components of the vacuum tank system 100, such as one or more valves, including offloading valves 140 and isolation valves; pumps including pump 166; the blower 164; or any other component of the vacuum tank system 100 that is desired to be operated automatically.

The controller 402 or distributed control system may control its outputs 406 in accordance with the information sensed at its inputs 404, for example, energizing the pump 166 when the site tank 120 reaches a low level, as sensed by a site tank low level switch or level sensor. The controller 402 or distributed control system may also perform one or more functional checks when the vacuum tank system 100 is energized. Where the controller 402 or distributed control system performs functional checks, it may automatically energize the pump 166 and blower 164, open valves including offload station 110 valves 140, air removal system 160 isolation valves, or a site tank 120 isolation valve and may monitor the truck 10 tank 12 offloading process through attached sensors as discussed herein.

The controller 402 or distributed control system may also communicate information it contains through wires or wirelessly, for example providing vacuum tank system 100 status and operational parameters to a user interface and receiving override commands or modified operational rules from the user interface.

An objective of the vacuum tank system 100, is to unload fluid from tanker trucks 10 in a short amount of time and the per-truck offloading time of such a system 100 is expected to be one-quarter of the offloading time required for conventional offloading.

Another aspect of the current invention is creation of a device that receives a 4-20 ma signal from a sensor and transmits that 4-20 ma signal to another device through wires or wirelessly, for example by way of Bluetooth technology.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A liquid laden tanker truck offloading manifold method, comprising:
   detecting a truck carrying a liquid laden tank in at least one of a plurality of offloading stations;

energizing a blower having an inlet duct coupled to an intermediate tank receiving fluid from the plurality of offloading stations, the blower to draw gasses from the intermediate tank when at least one tanker truck is offloading at at least one of the plurality of offloading stations;

de-energizing the blower when no tanker truck is offloading at any of the plurality of offloading stations;

energizing a pump having an inlet coupled to the intermediate tank when the intermediate tank level is above a predetermined high level; and de-energizing the pump when the intermediate tank level is below a predetermined low level.

2. The tanker truck offloading manifold method of claim 1, further comprising receiving a signal that identifies at least one truck positioned in at least one offloading station.

3. The tanker truck offloading manifold method of claim 1, further comprising receiving a signal indicating that a truck tank is coupled to the manifold.

4. The tanker truck offloading manifold method of claim 1 further comprising opening an offloading valve.

5. The tanker truck offloading manifold method of claim 1, further comprising applying vacuum to the manifold to draw fluid from the offloading tanker truck.

6. The tanker truck offloading manifold method of claim 5, further comprising reducing the vacuum when a tanker truck in at least one of the plurality of offloading stations is nearly empty.

7. The tanker truck offloading manifold method of claim 5, further comprising decreasing the vacuum as the fluid level in the truck tank decreases.

8. The tanker truck offloading manifold method of claim 1, further comprising receiving a signal from a sensor indicating when a truck is in one of the plurality of offloading stations.

9. The tanker truck offloading manifold method of claim 1, further comprising receiving information identifying the truck in one of the plurality of offloading stations.

10. The tanker truck offloading manifold method of claim 9, further comprising transmitting the information identifying the truck in one of the plurality of offloading stations from a truck present in one of the plurality of offloading stations.

11. The tanker truck offloading manifold method of claim 9, wherein the information identifying the truck in one of the plurality of offloading stations is received from an operator.

12. The tanker truck offloading manifold method of claim 11, wherein the operator is a driver of the tanker truck.

13. The tanker truck offloading manifold method of claim 9, wherein the information identifying the truck in one of the plurality of offloading stations is a unique identifier associated with the truck.

14. The tanker truck offloading manifold method of claim 13, wherein the truck operator provides the unique identifier associated with the truck.

15. The tanker truck offloading manifold method of claim 13, further comprising the truck in one of the plurality of offloading stations transmitting the unique identifier associated with the truck.

16. The tanker truck offloading manifold method of claim 1, further comprising attaching a transfer hose from the truck tank to the offloading station.

17. The tanker truck offloading manifold method of claim 1, further comprising opening an offloading valve associated with the offloading station occupied by the truck.

18. The tanker truck offloading manifold method of claim 1, further comprising pressurizing the truck tank.

19. The tanker truck offloading manifold method of claim 18, further comprising reducing the pressure in the truck tank as the fluid level in the truck tank is reduced.

20. The tanker truck offloading manifold method of claim 19, further comprising providing a truck tank level signal to an apparatus pressurizing the tank to reduce the pressure applied in the tank as the level of the tank is reduced.

* * * * *